(12) United States Patent
Fish et al.

(10) Patent No.: US 8,917,487 B2
(45) Date of Patent: Dec. 23, 2014

(54) METHOD AND CIRCUIT FOR DETECTING AND PROVIDING PROTECTION AGAINST AN OVERVOLTAGE CONDITION

(76) Inventors: Paul E. Fish, Lake Forest, CA (US); John R. Coupland, Laguna Woods, CA (US)

(*) Notice: Subject to any disclaimer, the term of this patent is extended or adjusted under 35 U.S.C. 154(b) by 182 days.

(21) Appl. No.: 13/506,087

(22) Filed: Mar. 26, 2012

(65) Prior Publication Data

US 2013/0250464 A1    Sep. 26, 2013

(51) Int. Cl.
*H02H 3/20* (2006.01)

(52) U.S. Cl.
USPC .......................................................... 361/91.4

(58) Field of Classification Search
USPC .......................................................... 361/91.4
See application file for complete search history.

(56) References Cited

U.S. PATENT DOCUMENTS

| | | | | |
|---|---|---|---|---|
| 5,237,480 A | * | 8/1993 | Dara | 361/42 |
| 5,392,349 A | * | 2/1995 | Elder, Jr. | 379/412 |
| 6,816,350 B1 | * | 11/2004 | Hoopes | 361/90 |

* cited by examiner

*Primary Examiner* — Jared Fureman
*Assistant Examiner* — Kevin J Comber

(57) ABSTRACT

A method and circuit are described for detecting an overvoltage condition and using the detection of the overvoltage condition to protect a circuit or component from the overvoltage condition. In one embodiment, an overvoltage protection circuit is used to detect an overvoltage condition on pin driver electronics, the detection of which is powered by the overvoltage condition itself, thus eliminating the need to provide overvoltage protection circuitry that requires power supplies with voltages greater than the pin electronics the overvoltage protection circuit is meant to protect.

13 Claims, 2 Drawing Sheets

METHOD AND CIRCUIT FOR DETECTING AND PROVIDING PROTECTION AGAINST AN OVERVOLTAGE CONDITION

FIELD OF THE INVENTION

This invention relates in general to electrical circuitry and more specifically to a method and circuit for detecting and providing protection against an overvoltage condition.

BACKGROUND

Overvoltage protection circuits are used to protect electrical or electronic circuits that can be damaged if subjected to overvoltage conditions such as caused by voltage transients, voltage spikes, electrical discharge, etc. Overvoltage conditions at a certain electrical point in an electrical circuit, such as an electrical connection point, pin of an integrated circuit, a certain input or output in a system, etc. can cause electrical circuits to become damaged and fail to perform their normal function.

Some prior art overvoltage condition protection circuits have included the use of metal oxide varistor (MOV) for protecting against high voltage conditions. MOVs however degrade over time and sometimes fail by creating a partial or complete short circuit of the line being protected and thereby affect the operation of the circuit being protected. Another overvoltage protection device is the thyristor surge protection device (TSPD) which is a solid-state electronic device typically used in crowbar protection circuits. Still another device used in protecting against overvoltage conditions is a silicon avalanche diode (SAD). SADs provide fairly fast limiting action of protection, but have very low energy absorbing capability, so are not useful in a lot of applications.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION

Figure 1:
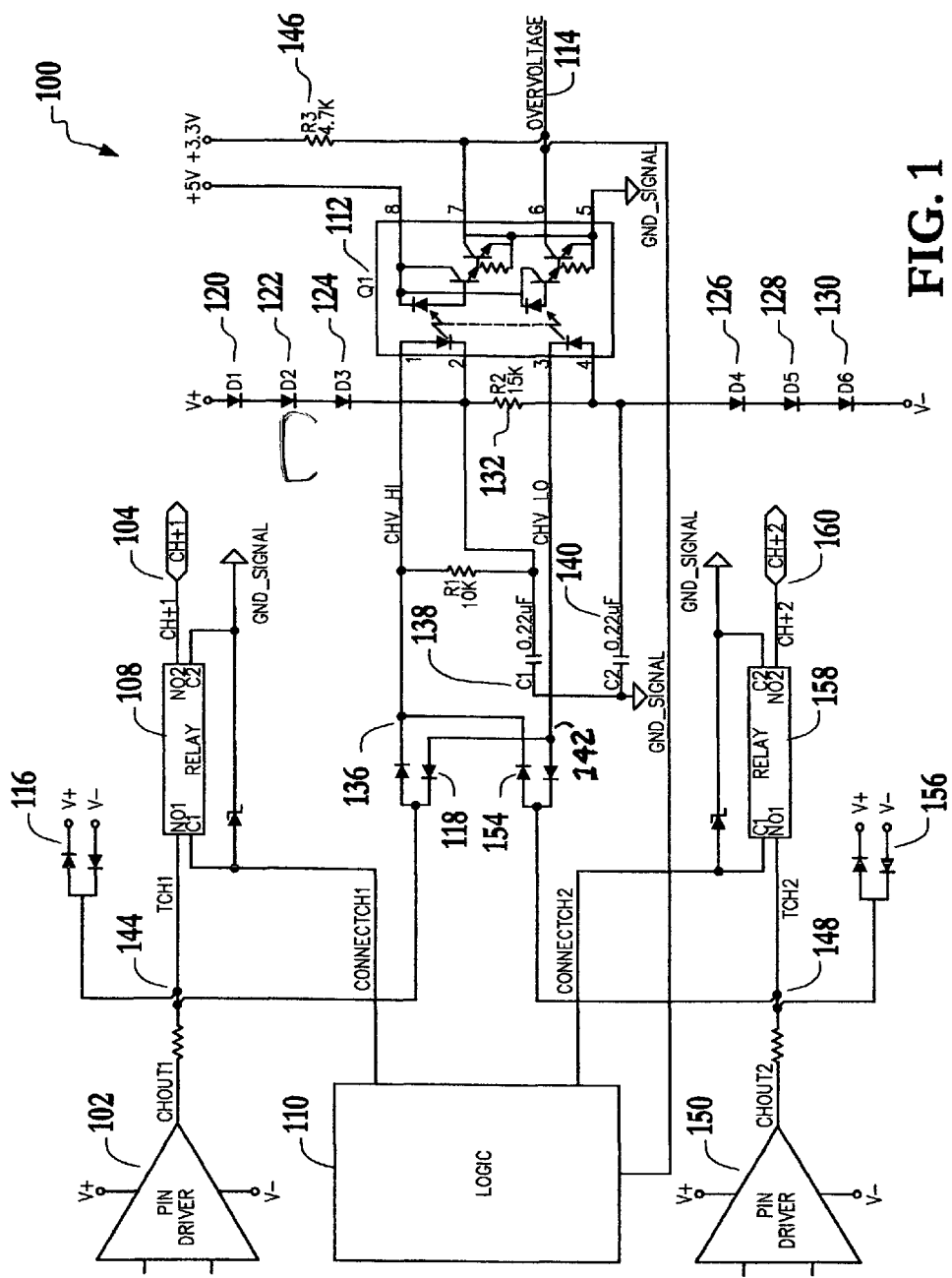
FIG. 1 shows an overvoltage protection circuit in accordance with one embodiment of the invention.

While the specification concludes with claims defining the features of the invention that are regarded as novel, it is believed that the invention will be better understood from a consideration of the following description in conjunction with the drawing figures.

Referring to FIG. 1, there is shown an overvoltage protection circuit 100 in accordance with an embodiment of the invention which is shown protecting a device(s) or circuit(s) against an overvoltage condition. In the described embodiment, the devices being protected by overvoltage protection circuit 100 are single pin drivers 102 and 150. It should be noted that although two devices 102 and 150 are being protected against overvoltage condition in FIG. 1, one or more devices can be protected using the overvoltage protection discussed herein. In this embodiment, the devices that are susceptible to an overvoltage condition are pin drivers 102 and 150 such as an INTERIL/PlanetATE Saturn pin driver that drive channels of a test system. The output of the pin driver 102 is shown labeled as CHOUT1, while that of pin driver 150 is labeled CHOUT2. The positive supply voltage (V+) and the negative supply voltage (V−) are used to power the pin drivers 102 and 150 and can vary in voltage to the maximum or minimum supply requirement specifications for the particular pin electronics to operate correctly. While pin driver circuits 102 and 150 are being protected against an overvoltage condition in this described embodiment, the invention can be used to protect any number of different circuits including either discrete or integrated components. In this description the use of the term device will include not just a singular device but will also include a circuit.

The electrical contact point labeled CH+1 104 is a connection point that electrically connects in this particular embodiment to a unit-under-test (UUT) which is not shown in FIG. 1, although in other embodiments it can connect to other electrical circuits/components. Similarly, pin driver 150 has a connection point CH+2 160. The line labeled TCH1 is the line between an electrical isolation circuit such as a reed relay 108 in this embodiment and the pin driver 102 that is used as an input (coupling via diode circuit 118) to the overvoltage protection circuit. Similarly, line TCH2 is the line between an electrical isolation circuit such as a reed relay 158 and pin driver 150. Line TCH2 is connected to contact point 148 which provides an input via diode circuit 154 to optoisolator 112 and the associated circuitry of the overvoltage protection circuit 100 that is used to control relay 158 and cause it to become an electrically open circuit if the overvoltage protection circuit 100 determines an overvoltage condition has occurred.

Although a reed relay 108 is used to provide the electrical isolation for the pin driver 102 during an overvoltage condition (similarly relay 158 for driver 150), other types of electrical isolation circuits can be used as known in the art, such as using a transistor, such as a Field-Effect Transistor (FET), optoisolators, etc. The isolation circuit provides electrical isolation between the output of the device being protected against overvoltage conditions, in this case pin drivers 102 and 150, and any overvoltage conditions coming in at points CH+1 104 and CH+2 160.

Electrical contact point 144 is the connection where it is being determined if an overvoltage condition has occurred when reed relay 108 is in the closed position, and CH+1 104 and TCH1 are electrically interconnected. A logic circuit 110 controls the operation of the reed relay 108 via output signal CONNECTCH1 causing it to open or close as required. Similarly, reed relay 158 is controlled via output signal CONNECTCH2. Although a logic circuit 110 is shown in this embodiment, it should be noted that it is not required in other embodiments where an overvoltage signal, labeled OVERVOLTAGE 114 can be connected directly to the relay 108 (and/or relay 158) and cause it to be placed in an open position where it electrically isolates the electrical contact point 144 from CH+1 104, and/or electrical contact point 148 from CH+2 160, thereby preventing an overvoltage condition from affecting pin driver 102 and/or pin driver 150. Depending on the particular design requirement at hand, the logic circuit 110 can be one or more simple logic circuit(s) (e.g., a simple logic NOT circuit receiving as an input signal CONNECTCH1 and/or CONNECTCH2, or a transistor circuit that converts the low level OVERVOLTAGE condition signal 114 into a signal that can activate the relay 108 (and/or relay 158) and cause it to generate an open circuit) that takes an overvoltage condition signal 114 and converts it to an electrical signal that can cause the relay 108 to open, thereby isolating the pin driver circuit 102 from an overvoltage condition coming from CH+1 104, and/or causes relay 158 to open, thereby isolating the pin driver circuit 150 from an overvoltage condition coming from CH+2 160.

In other embodiments, the logic circuit 110 can be more sophisticated and can provide further capabilities such as providing an overvoltage condition status signal to other circuitry either located locally or remotely (e.g., sending an overvoltage condition signal via an Ethernet connection, or providing a local visual and/or audio overvoltage condition signal. If a more sophisticated design is required, logic circuit 110 can include a microprocessor or microcontroller or other more sophisticated control circuit.

In the described embodiment, a dual optoisolator 112, such as a FAIRCHILD HCPL0731, is used to isolate the pin driver circuit 102 by providing the overvoltage condition signal (OVERVOLATAGE 114) during an overvoltage condition that causes logic circuit 110 to send a signal CONNECTCH1 and/or CONNECTCH2 to cause relays 108 and/or 158 to open. A dual optosiolator 112 is used in this embodiment since both the V+ and V− supply lines are being monitored for overvoltage conditions. Although a particular optoisolator is used in this embodiment for the detection circuit, other circuits can be used to generate the overvoltage condition signal, OVERVOLTAGE 114.

The output labeled OVERVOLTAGE 114 is the output signal from the detection circuit that indicates that an overvoltage condition is present in the circuit and is sent to logic circuit 110 to provide the necessary signals CONNECTCH1 and/or CONNECTCH2 to isolate the pin drivers 102 and 150. The signals CONNECTCH1 and CONNECTCH2 cause the reed relays 108 and/or 150 to enter an open state thereby electrically isolating CH+1 104 from the output CHOUT1 of pin driver 102 and/or CH+2 160 from the output CHOUT2 of pin driver 150. This isolation of the output of the pin drivers 102 and 150 helps protect them from damage or destruction. The OVERVOLTAGE output signal 114 can also be used to generate a visual or audio condition alert that alerts the user of the circuit of the overvoltage condition.

Diode circuit 116 comprising two diodes coupled on one end anode to cathode and connected to electrical contact point 144 and the other end one diode connected to the V+ supply and the other diode to the V− supply voltage provides additional protection for the pin driver 102 by clamping voltage transients outside of the V+ and V− supply range. In the embodiment shown, the diode circuit 116 is intended to allow additional time for reed relay 108 to open after an overvoltage condition has been detected. This diode configuration 116 can be repeated if additional channels need protection (a second optional channel is shown for illustrative purposes using diode circuit 156 connected to contact point 148), with each additional channel having a similar diode circuit. A second diode circuit 118 includes two diodes coupled in reverse orientation (anode to cathode) on one side coupled to connection 144, with the other sides of the diodes being coupled to pins 1 and 3 of the optoisolator 112 as shown. Diode circuit 118 provides the connection from the individual channel being monitored for overvoltage condition to the detector circuit. Again if additional channels are being protected this diode circuit 118 is repeated for each additional channel that needs its pin driver protected against overvoltage conditions. In FIG. 1 a second channel is shown and a second diode circuit 154 is used to connect the channel being monitored with the detector circuit.

Diodes 120-124 are combined to provide a voltage reference circuit by means of their fixed voltage drops that is electrically lower than the V+ supply voltage. This supply voltage reference provides a detection point that is set lower than the V+ supply voltage. Diodes 126-130 combine to provide a voltage reference by means of their fixed voltage drops that is electrically higher than the V− voltage reference. This voltage reference provides a detection point that is set higher than the V− supply voltage. Although three diodes are used in this embodiment, different designs could use different numbers of diodes or other components that can create a voltage drop (e.g., p-n junction of transistors, etc).

Resistor (R2) 132 located connected between diodes 120-124 and diodes 126-130 allows a small current sufficient to properly establish the reference voltage needed for the circuit to operate correctly. Resistor (R1) is used to provide a bias on the CHV_HI (Channel Voltage Hi) signal line 136 close to pin 2 of the optoisolator 112 in order to keep the circuit from coupling to the TCH1 line. Resistor (R3) 146 provides a pull-up function to pin 7 of the optoisolator 112. Capacitors (C1) 138 and (C2) 140 help keep the voltage references for the detector circuit stable. Although particular values of resistors and capacitors have been used in this embodiment as shown in FIG. 1, different designs can use different values per the requirements of the design at hand.

In order to better understand how the overvoltage protection circuit 100 operates, the operation of the circuit 100 will now be discussed. During normal operation, pin driver 102 provides output stimulus or input stimulus via a connection, channel−1 (CH−1) 104 to a UUT which is not shown in FIG. 1. When the reed relay 108 is closed, TCH1 line and electrical contact point 144 which are coupled to pin driver 102 output are electrically connected to CH+1 104, at which time the pin electronics 102 becomes vulnerable to damage from voltage transients outside of the circuit's normal V+ and V− voltage supply levels that might get applied to CH+1 104. Specifically, if the TCH1 line/contact point 144 goes higher than the V+ supply by more than a diode drop, or lower than the V− supply, a dangerous voltage condition can affect the operation of the pin driver 102 and potentially damage pin driver 102. The pin driver 102 has some limited tolerance to this condition, as it may support sourcing or sinking of a limited amount of current, but if enough current above that which it can source or sink is presented, pin driver 102 can be damaged or completely destroyed by an overvoltage condition.

Diode circuit 116 provides additional protection to the pin driver circuit 102 by clamping the TECH1 line to the V+ and V− supplies. While diode circuit 118 provides the connection to the detection circuit for both high and low overvoltage conditions. If the TCH1 line approaches the V+ voltage rail, the CHV_HI line 136 will forward bias the light-emitting diode (LED) located between pins 1 and 2 in the optoisolator 112. This will cause the output transistor associated with the LED to turn on, pulling the OVERVOLATAGE condition signal 114 low by driving one side of the pull-up resistor 146 to ground. The OVERVOLTAGE condition signal 114 is used by the logic circuit 110 to turn off the reed relay 108, isolating the TCH1 line from the CH+1 line 104 by opening the electrical connection between the two lines, and protecting the pin driver 102 from the overvoltage condition that is found on the CH+1 line 104. It should be noted, that although in this embodiment the OVERVOLTAGE condition signal 114 is designed so that a low level condition represents an overvoltage condition, in another design, a high logic level could be used to represent the overvoltage condition depending on the particular design requirements.

Similarly, if the TCH1 line approaches the V− voltage rail, the CHV_LO line 142 will forward bias the LED located between pins 3 and 4 and found inside of the optoisolator. This will cause the output transistor to turn on, pulling the OVERVOLTAGE signal 114 signal low. This low signal condition on the OVERVOLTAGE signal 114 causes the logic circuit 110 to turn off reed relay 108, again isolating the TECH1 line from the CH+1 line 104 and thereby protecting the pin driver 102 from the overvoltage condition.

One advantage of the invention as shown in the embodiment of FIG. 1 is that the overvoltage detection circuit does not require voltages greater than the pin driver 102 to operate; this provides an advantage in that extra supply voltage does not need to be provided for the detection circuitry 100.

A second channel including a second pin driver 150, second contact point 148, diode circuits 154 and 156, electrical isolation circuit 158 comprising a relay isolating electrical contact point 152 and channel two (CH+2) 160 is shown just to highlight, that the OVERVOLTAGE signal 114 can electrically isolate more than one device (pin drivers 102,150) at one time in an alternative embodiment. The invention can be used with any number of channels and devices that need overvoltage protection.

Figure 2:
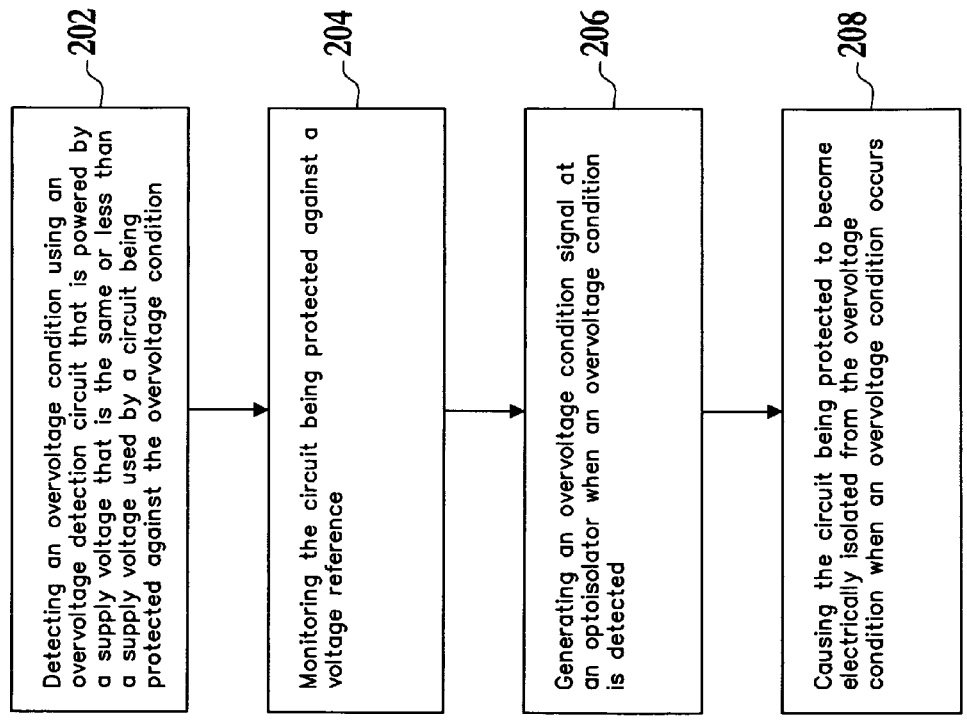
FIG. 2 shows a flow diagram highlighting a method of overvoltage protection in accordance with an embodiment of the invention.

Referring now to FIG. 2, there is shown a flow diagram highlighting a method for providing overvoltage protection. In 202, an overvoltage condition is detected using an overvoltage detection circuit that is powered by a supply voltage that is the same or lower than a supply voltage used by the circuit that is being protected from the overvoltage condition. In 204, the voltage at the circuit being protected is monitored against a voltage reference by the overvoltage protection circuit. In one embodiment, the overvoltage protection circuit 100 includes an optoisolator 112 that generates the overvoltage protection signal when an overvoltage condition is detected. In 206, the overvoltage circuit generates an overvoltage condition signal if an overvoltage condition has occurred. In 208, the overvoltage condition signal causes the circuit being protected to be electrically isolated from the overvoltage condition. In one embodiment this electrical isolation is performed by a relay 108.

One benefit of the overvoltage protection circuit 100 is that it can operate using supply voltage(s) that are the same or lower than the circuit that is being protected, in the described embodiments that would be pin driver devices 102 and 150, from the overvoltage condition. It also allows, in one embodiment, for one optoisolator to protect one or more circuits against overvoltage protection, making it an economical solution for example in test equipment that have numerous channels where each channel requires overvoltage protection. The level at which an overvoltage condition is determined to exist can be designed for whatever voltage level desired depending on the particular design requirements.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An overvoltage detection circuit that can detect if an overvoltage condition has occurred at a certain electrical contact point, the overvoltage detection circuit, comprising:
    an input coupled to the electrical contact point being detected for an overvoltage condition;
    a circuit that is susceptible to the overvoltage condition coupled to electrical contact point and the overvoltage detection circuit is powered by a supply voltage that is the same as or less than the supply voltage used by the circuit that is susceptible to the overvoltage condition; the supply voltage comprises a positive voltage and negative voltage;
    a voltage reference circuit coupled to the input, the voltage reference circuit providing a detection point that is set lower than the positive voltage and a second detection point set higher than the negative voltage; and
    an optoisolator including first and second optoisolator circuits coupled to the voltage reference circuit, the optoisolator generating an overvoltage condition signal if the voltage reference circuit detects an overvoltage condition at the electrical contact point, the overvoltage condition signal being generated by the first optoisolator circuit if an overvoltage condition occurs to the positive voltage and the overvoltage condition signal being generated by the second optoisolator circuit if the overvoltage condition occurs to the negative voltage.

2. An overvoltage detection circuit as defined in claim 1, further comprising:
    an electrical isolation circuit coupled to the electrical contact point, the electrical isolation circuit electrically isolating the electrical contact point from the overvoltage condition in response to the optoisolator generating the overvoltage condition signal.

3. An overvoltage detection circuit as defined in claim 2 wherein the electrical isolation circuit comprises a relay.

4. An overvoltage detection circuit as defined in claim 3, further comprising:
    a logic circuit in response to the overvoltage condition signal causes the relay to form an open circuit between the electrical contact point and the overvoltage condition.

5. An overvoltage protection circuit, comprising:
    an electrical contact point that requires protection against an overvoltage condition;
    a diode circuit including first and second diodes each having an anode and a cathode and connected in parallel with respect to each other, with the anode of the first diode connected to the cathode of the second diode, the diode circuit coupled to the electrical contact point at the point where the anode of the first diode is connected to the cathode of the second diode, the cathode of the first diode is coupled to a positive supply voltage and the anode of the second diode is coupled to a negative supply voltage;
    an optoisolator coupled to the diode circuit, the optoisolator including a first optoisolator circuit for generating an overvoltage condition signal if the positive supply voltage at the electrical contact point exceeds a positive supply voltage reference, and a second optoisolator circuit for generating the overvoltage condition signal if the negative supply voltage at the contact point goes lower than a negative supply voltage reference; and
    at least two devices that can provide a voltage drop coupled in series forming the positive supply voltage reference and the negative supply voltage reference for the optoisolator.

6. An overvoltage protection circuit as defined in claim 5, further comprising:
    an electrical isolation circuit coupled to the optoisolator and in response to the overvoltage condition signal electrically isolates the electrical contact point to the overvoltage condition.

7. An overvoltage protection circuit as defined in claim 6, wherein the electrical isolation circuit comprises a relay.

8. An overvoltage protection circuit as defined in claim 5, further comprising:
    a second electrical contact point that requires protection against an overvoltage condition; and a second electrical isolation circuit coupled to the optoisolator and in response to the overvoltage condition signal electrically isolates the second electrical contact point to the overvoltage condition.

9. A method for providing overvoltage protection, comprising:
   detecting an overvoltage condition with an overvoltage detection circuit that is powered by a supply voltage that is the same as or less than a supply voltage used by a device that is being protected against the overvoltage condition;
   determining if an overvoltage condition at a certain electrical contact point coupled to the device that is being protected against the overvoltage condition has occurred by:
   causing a light-emitting diode in an optoisolator to activate if the voltage in the electrical contact point as compared to a voltage reference is determined to be higher than a predetermined voltage level or causing a second light emitting diode in the optoisolator to activate if the voltage in the electrical point as compared to a second voltage reference is determined to be lower than a second predetermined voltage level; and
   generating an overvoltage condition signal when either of the first or second light emitting diodes activate.

10. A method as defined in claim 9, further comprising:
    using the overvoltage condition signal to electrically isolate the device that is being protected against the overvoltage condition.

11. A method as defined in claim 10, wherein the device that is being protected against the overvoltage condition is isolated from the overvoltage condition by use of a relay that is activated in response to the overvoltage condition signal.

12. A method as defined in claim 9, wherein the generating of the overvoltage condition signal includes;
    presenting the overvoltage condition signal to a logic circuit.

13. A method as defined in claim 12, further comprising:
    using the logic circuit to cause a relay to electrically isolate the device being protected against the overvoltage condition.

* * * * *

(12) EX PARTE REEXAMINATION CERTIFICATE (10791st)
United States Patent
Fish et al.

(10) Number: US 8,917,487 C1
(45) Certificate Issued: Jan. 8, 2016

(54) METHOD AND CIRCUIT FOR DETECTING AND PROVIDING PROTECTION AGAINST AN OVERVOLTAGE CONDITION

(75) Inventors: Paul E. Fish, Lake Forest, CA (US); John R. Coupland, Laguna Woods, CA (US)

(73) Assignee: EADS NORTH AMERICA, INC., Irvine, CA (US)

Reexamination Request:
No. 90/013,459, Mar. 30, 2015

Reexamination Certificate for:
Patent No.: 8,917,487
Issued: Dec. 23, 2014
Appl. No.: 13/506,087
Filed: Mar. 26, 2012

(51) Int. Cl.
*H02H 3/20* (2006.01)

(52) U.S. Cl.
CPC ........................................ *H02H 3/20* (2013.01)

(58) Field of Classification Search
CPC ........................................ H02H 3/20

USPC .......................................................... 361/91.4
See application file for complete search history.

(56) References Cited

To view the complete listing of prior art documents cited during the proceeding for Reexamination Control Number 90/013,459, please refer to the USPTO's public Patent Application Information Retrieval (PAIR) system under the Display References tab.

*Primary Examiner* — Linh Nguyen

(57) ABSTRACT

A method and circuit are described for detecting an overvoltage condition and using the detection of the overvoltage condition to protect a circuit or component from the overvoltage condition. In one embodiment, an overvoltage protection circuit is used to detect an overvoltage condition on pin driver electronics, the detection of which is powered by the overvoltage condition itself, thus eliminating the need to provide overvoltage protection circuitry that requires power supplies with voltages greater than the pin electronics the overvoltage protection circuit is meant to protect.

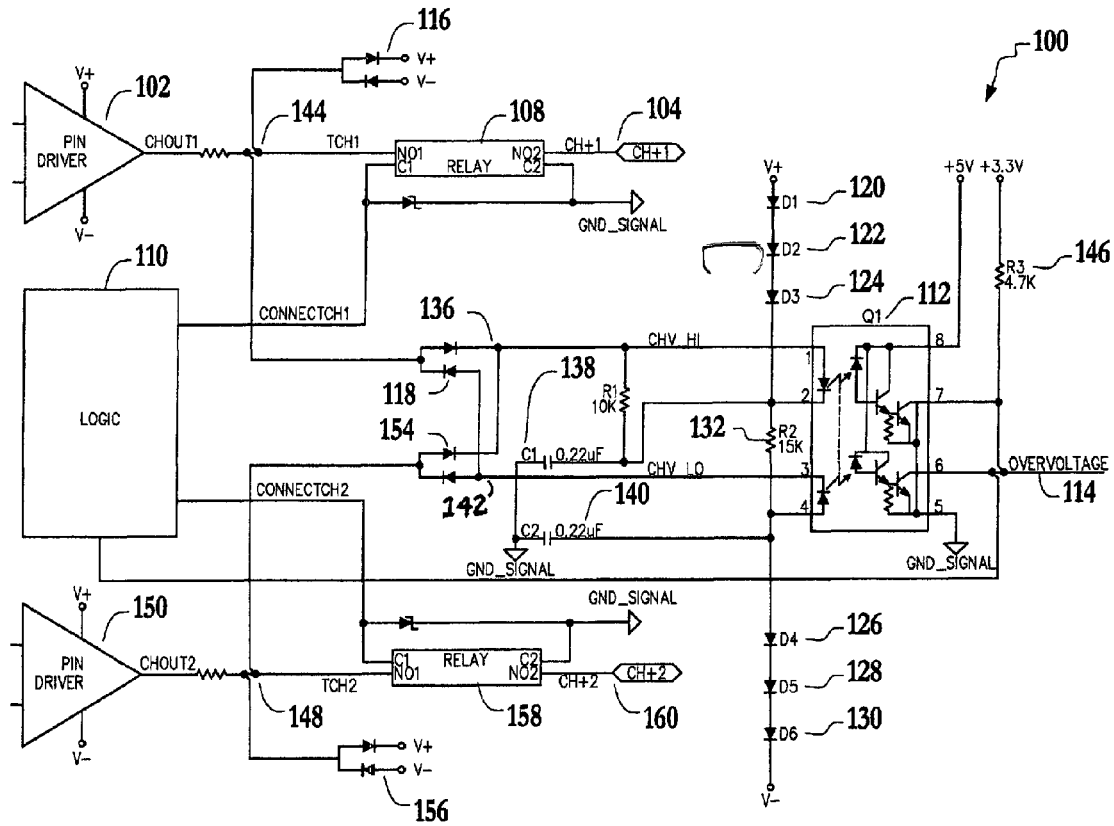

US 8,917,487 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

Claims 2, 5, 8, and 9 are determined to be patentable as amended.

Claims 3, 4, 6, 7 and 10-13, dependent on an amended claim, are determined to be patentable.

2. An overvoltage detection circuit as defined in claim 1, further comprising:
   an electrical isolation circuit coupled to the electrical contact point, the electrical isolation circuit electrically isolating the electrical contact point from the overvoltage condition in response to the optoisolator generating the overvoltage condition signal, *wherein the electrical isolation circuit causes an output of the circuit that is susceptible to the overvoltage condition to become electrically isolated when the overvoltage condition signal is generated when either or both of the positive and negative supply voltages are found to be in an overvoltage condition, thereby preventing the circuit that is susceptible to the overvoltage condition from sourcing or sinking current at levels that can damage the circuit.*

5. An overvoltage protection circuit, comprising:
   an electrical contact point that requires protection against an overvoltage condition;
   a diode circuit including first and second diodes each having an anode and a cathode and connected in parallel with respect to each other, with the anode of the first diode connected to the cathode of the second diode, the diode circuit coupled to the electrical contact point at the point where the anode of the first diode is connected to the cathode of the second diode, the cathode of the first diode is coupled to a positive supply voltage and the anode of the second diode is coupled to a negative supply voltage;
   an optoisolator coupled to the diode circuit, the optoisolator including a first optoisolator circuit for generating an overvoltage condition signal if the positive supply voltage at the electrical contact point exceeds a positive supply voltage reference, and a second optoisolator circuit for generating the overvoltage condition signal if the negative supply voltage at the contact point goes lower than a negative supply voltage reference; [and] at least two devices that can provide a voltage drop coupled in series forming the positive supply voltage reference and the negative supply voltage reference for the optoisolator*; and*
   *a second diode circuit including first and second diodes each having an anode and a cathode and connected in parallel with respect to each other, with the anode of the first diode connected to the cathode of the second diode, the diode circuit coupled to the electrical contact point at the point where the anode of the first diode is connected to the cathode of the second diode, and the cathode of the first diode is coupled to the first optoisolator circuit and the anode of the second diode is coupled to the second optoisolator circuit.*

8. An overvoltage protection circuit as defined in claim [5] *6*, further comprising:
   a second electrical contact point that requires protection against an overvoltage condition; and
   a second electrical isolation circuit coupled to the optoisolator and in response to the overvoltage condition signal electrically isolates the second electrical contact point to the overvoltage condition.

9. A method for providing overvoltage protection, comprising:
   detecting an overvoltage condition with an overvoltage detection circuit that is powered by a supply voltage that is the same as or less than a supply voltage used by a device that is being protected against the overvoltage condition;
   determining if an overvoltage condition at a certain electrical contact point coupled to the device that is being protected against the overvoltage condition has occurred by:
      causing a light-emitting diode in an optoisolator to activate if the voltage in the electrical contact point as compared to a voltage reference is determined to be higher than a predetermined voltage level or causing a second light emitting diode in the optoisolator to activate if the voltage in the electrical point as compared to a second voltage reference is determined to be lower than a second predetermined voltage level; and
      generating an overvoltage condition signal when either of the first or second light emitting diodes activate*; and*
   *causing an output of the device that is being protected against the overvoltage condition to become electrically isolated when the overvoltage condition signal is generated when either or both of the positive and negative supply voltages are found to be in an overvoltage condition, thereby preventing the device from sourcing or sinking current at levels that can damage the device.*

\* \* \* \* \*